(12) United States Patent
Doljack

(10) Patent No.: US 7,690,343 B2
(45) Date of Patent: Apr. 6, 2010

(54) METHODS AND SYSTEMS FOR SUPPLYING POWER TO A LOAD

(75) Inventor: Frank Anthony Doljack, Pleasanton, CA (US)

(73) Assignee: Cooper Technologies Company, Houston, TX (US)

( * ) Notice: Subject to any disclaimer, the term of this patent is extended or adjusted under 35 U.S.C. 154(b) by 46 days.

(21) Appl. No.: 12/059,966

(22) Filed: Mar. 31, 2008

(65) Prior Publication Data

US 2008/0276892 A1 Nov. 13, 2008

Related U.S. Application Data

(60) Provisional application No. 60/910,064, filed on Apr. 4, 2007.

(51) Int. Cl.
*F02N 11/08* (2006.01)
(52) U.S. Cl. ............... 123/179.28; 123/179.25; 307/48; 320/166

(58) Field of Classification Search .......... 123/179.28, 123/179.25; 307/48; 320/134, 166
See application file for complete search history.

(56) References Cited

U.S. PATENT DOCUMENTS

| | | | | |
|---|---|---|---|---|
| 5,155,373 A | * | 10/1992 | Tsuchiya et al. | 290/38 R |
| 5,563,454 A | * | 10/1996 | Araki et al. | 307/10.6 |
| 5,608,344 A | | 3/1997 | Marlow | |
| 5,818,115 A | * | 10/1998 | Nagao | 290/31 |
| 5,867,009 A | | 2/1999 | Kiuchi et al. | |
| 6,373,152 B1 | | 4/2002 | Wang et al. | |
| 6,681,736 B2 | * | 1/2004 | Sumimoto et al. | 123/179.3 |
| 7,145,259 B2 | * | 12/2006 | Spellman et al. | 290/38 R |
| 2002/0078914 A1 | | 6/2002 | Manabe et al. | |

OTHER PUBLICATIONS

International Search Report for PCT/US2008/058609; Jul. 31, 2008; 12 pages.

* cited by examiner

*Primary Examiner*—Hai H Huynh
(74) *Attorney, Agent, or Firm*—Armstrong Teasdale LLP

(57) ABSTRACT

Methods and systems for controlling a supply of power to a load are provided.

42 Claims, 8 Drawing Sheets

METHODS AND SYSTEMS FOR SUPPLYING POWER TO A LOAD

CROSS-REFERENCE TO RELATED APPLICATION

This application claims priority to U.S. Provisional Application Ser. No. 60/910,064 which was filed on Apr. 4, 2007 and is entitled "Methods and Systems for Supplying Power to a Load" by Frank A. Doljack, and which is incorporated by reference herein.

BACKGROUND

The invention relates generally to methods and systems for supplying power to a load and more particularly, to methods and systems for supplying power to the load from a secondary power source.

DETAILED DESCRIPTION

Figure 1:
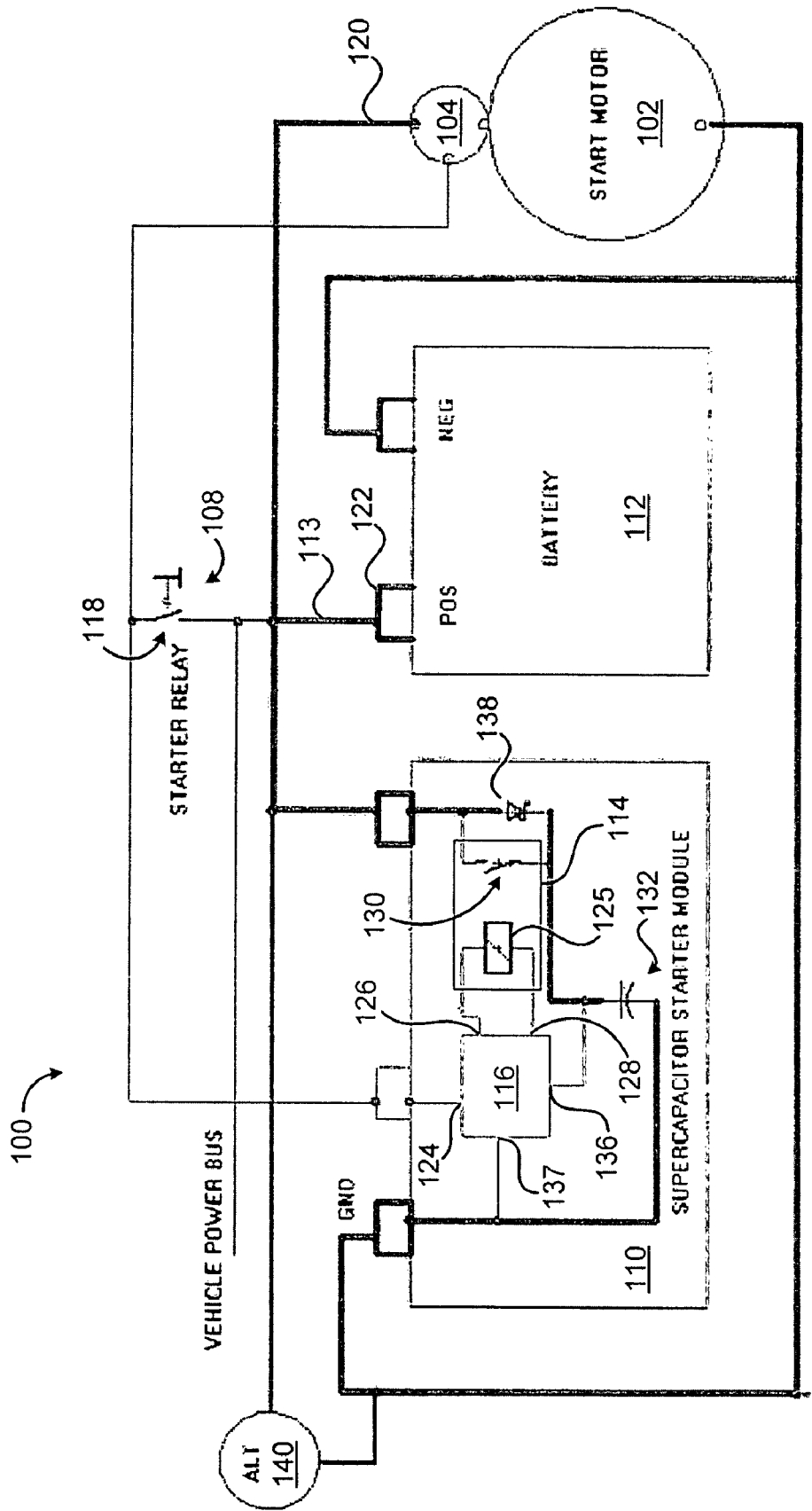
FIG. 1 is a schematic block diagram of an engine starter system according to an exemplary embodiment of the present invention.

Engines that operate on gasoline, diesel, or other fuels may be started using electric starter motors. An electric starter motor can be temporarily operated from a stored power source such as a battery. A starter motor may be operated for a time period long enough for the engine to successfully start. A secondary power source may be used in addition to the battery to power the starter motor. Such a combined primary and secondary power source can supply the high starter motor current necessary to successfully start a vehicle engine, or other engine such as a generator, even in very cold temperature conditions. Exemplary secondary electric power sources include a capacitor and an array of capacitors. More specifically, one or more electrochemical, double layer capacitors may be used as the secondary source. Such a capacitor may be known as a supercapacitor.

A secondary power source, such as a supercapacitor, may be intentionally isolated from the primary power source except during the starting event and during the time it takes to recharge the supercapacitor. Such isolation may ensure that the supercapacitor is operated only during the starting of the engine and not throughout the entire operating time of the engine or vehicle.

Furthermore, a secondary power source, such as a supercapacitor, may be intentionally isolated from the primary power source during a short initial period of the starting event. Such isolation may be considered a start-up delay. During this brief initial start-up delay, the starter motor may be powered only by the primary power source, as the secondary power source may be isolated. This delay may prevent an increased amount of current from being supplied to the starter motor as it begins to turn. Preventing an initial increase in the current supplied to the starter motor can allow gears associated with the starter motor to become fully engaged before the increased current is applied. Increased current, if applied without the start-up delay, can cause very rapid acceleration of the starter motor. This rapid acceleration and the associated velocity mismatch between the gears associated with the starter motor may be great enough to cause mechanical damage to the gears during engagement. This phenomenon has been described as gear milling or more specifically as ring gear milling.

While gears and gear milling are discussed in relationship to the start-up delay, other engagement or transmission means for coupling energy from a starter motor, starter actuator, or other starter mechanism to an engine may be operated with the invention. Some examples may be: belts, pulleys, wheels, chains, sprockets, cams, levers, clutches, or any other pneumatic, hydraulic, frictional, mechanical or electromagnetic coupling as well as any combination thereof. In all such instances, a start-up delay of the secondary power source may afford a more gradual starting current. Gradual starting current may allow inertial and frictional forces within the system to be overcome before the full starting current is applied.

Reference will now be made to specific exemplary embodiments as illustrated in the accompanying drawings. While the invention will be described in conjunction with these exemplary embodiments, it will be understood that it is not intended to limit the invention to such embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details.

Turning now to FIG. 1, the figure illustrates a schematic block diagram of an engine starter system 100 in accordance with an exemplary embodiment of the present invention. The starter system 100 can include a starter motor 102 that is mechanically coupled to an engine (not shown). The starter motor 102 may include a pinion gear rotatable by the shaft of the starter motor 102. The pinion gear may be configured to engage a ring gear coupled to the engine. Through such a coupling, the engine can begin rotating before the engine starts. After the engine starts, an over-run clutch may allow the pinion gear to spin free until the pinion gear disengages from the ring gear. The starter motor 102 receives electrical power through a starter contactor 104. The starter contactor 104 may also be referred to as a solenoid or a relay. The contactor 104 receives electrical power from a starting circuit. The starter circuit may include a keyed ignition switch, a push button start switch, control logic, and/or a starter relay 108.

The starter system 100 may also include a supercapacitor starter module 110 and a storage battery 112. The storage battery 112 is the primary power source and the supercapacitor module 110 is the secondary power source. Both the supercapacitor starter module 110 and the storage battery 112 may be coupled to the battery bus 113. The supercapacitor starter module 110 may include an isolator contactor 114 and an isolator control module 116. The starter system 100 can include cables that carry high currents for powering the starter motor 102 and for recharging the supercapacitor 132. The starter system 100 can also include substantially lower current carrying wires. These lower current conductors convey voltage signal information or contactor activation current levels. The starter system 100 both uses and compensates for the resistive nature of the high current carrying cables. Such cables are a necessary part of a vehicle starting system.

During operation, a user may initiate engine starting by indirectly closing the contacts 118 of starter relay 108. At this instant, the voltage on the battery bus 113 can be delivered to both the isolator control module 116 and the control input of the starter contactor 104. After approximately fifty milliseconds, the contacts of starter contactor 104 close, at which time a very high current may flow through cable 120 through the contacts of starter contactor 104 to finally power the starter motor 102. This high current flow causes a large voltage decrease at the positive terminal 122 of the battery 112. Since the starter relay contacts 118 remain closed, the voltage decrease may be sensed at node 124 of the isolator control module 116.

The isolator control module 116 may begin a start-up delay of approximately thirty milliseconds at the instant when the starter relay contacts 118 close. The closing of the starter relay contacts 118 allows the voltage from the battery 112 to appear at node 124 where the voltage can be sensed by the isolator control module 116. At the end of the start-up delay, the isolator control module 116 can deliver power to a coil 125 of the isolator contactor 114. This coil power appears at terminals 126 and 128 of the isolator control module 116. Approximately fifty milliseconds after powering coil 125 of the isolator contactor 114, the contacts 130 of isolator contactor 114 may close. The closure of the contacts 130 within the isolator contactor 114 may allow high current to flow from the supercapacitor 132 to the starter motor 102. This current from the supercapacitor 132 supplements the power delivered to starter motor 102. The voltage at the positive terminal of the supercapacitor 132 can be sensed at node 136 of the isolator control module 116. As the high current begins to flow out of the supercapacitor 132, the voltage at node 136 decreases because the high current of the supercapacitor 132 flows through the effective series resistance (ESR) of the supercapacitor 132 and the supercapacitor 132 begins to discharge.

When current flows from the supercapacitor 132, the voltage at various points along the cable 120 may increase. This increase may be a result of the boost delivered by the supercapacitor 132. This capacitor assist can begin approximately thirty milliseconds after the starter motor 102 has begun to operate. The delay may substantially reduce or eliminate ring-gear milling. The thirty millisecond delay can also be any other duration including zero for no delay.

An electric starter motor 102 may contain a pinion gear. The teeth of the pinion gear may mesh with a ring gear. The ring gear, in turn, may be coupled to the engine. When the pinion gear teeth are engaged with the ring gear, rotation of the starter motor can rotate and crank the engine. The pinion gear may be normally disengaged from the ring gear and only engage the ring gear as the electric starter motor shaft begins to rotate. The initial motion of the starter motor rotation can thrust the pinion gear forward and engage the ring gear. Engagement may normally occur before the pinion gear has gained any appreciable rotational velocity. Thus, the mechanical impact on the gear teeth caused by the mismatch in their velocities at the moment of engagement may not be great enough to cause mechanical damage. However, when a secondary power source, such as a supercapacitor 132, is used in combination with the primary power source 112, there may be a very high initial current supplied to the starter motor 102. This high current may cause very rapid acceleration of the shaft of the starter motor 102, and thus a very rapid acceleration of the pinion gear. The pinion gear velocity mismatch with the ring gear may be great enough to cause mechanical damage to the gears during engagement. This damage, known as ring gear milling, may be substantially reduced or eliminated by delaying the application of current from the superconductor 132 to the starter motor 102 for a short period after the primary power supply is first applied to the starter motor 102. An example of the short period is thirty milliseconds.

Once the engine starts, the user may deactivate the starter relay 108 allowing the relay contacts 118 to open. The opening of the contacts 118 may cause the circuit containing node 124 to become an open circuit. At this time, the voltage that is sensed at node 136 may be about the voltage level that was present just prior to the opening of the relay contacts 118. This voltage level may be indicative of the amount of energy that remains in supercapacitor 132 and hence related to how much energy has been discharged from supercapacitor 132.

After the opening of the relay contacts 118, the isolator control module 116 may maintain engagement of the isolator contactor 114. This engagement of the isolator contactor 114 can continue as long as the voltage at node 136 remains below a predetermined value. This predetermined value is the voltage that is considered to be a full charge of supercapacitor 132 for the given system. Current is therefore permitted to flow from the positive terminal 122 of the battery 112 into the supercapacitor 132 until the supercapacitor 132 has been recharged. Note that a node 137 of the isolator control module 116 senses the ground potential as a basis for sensing the other voltage levels.

Once the voltage at node 136 increases to the predetermined recharge value, the isolator control module 116 can disengage the isolator contactor 114. Disengagement of the isolator contactor 114 can allow the isolator contacts 130 to open. At this point, the freshly recharged supercapacitor 132 may remain isolated from the battery bus 113.

If the engine remains unused for an extended period, the supercapacitor 132 may self-discharge to a voltage that is too low to be useful. A blocking diode 138 can permit current from the battery 112 to maintain the charge on the supercapacitor 132. This can maintain a voltage level on the supercapacitor 132 that is approximately equal to the voltage of the battery bus 113.

Figure 2:
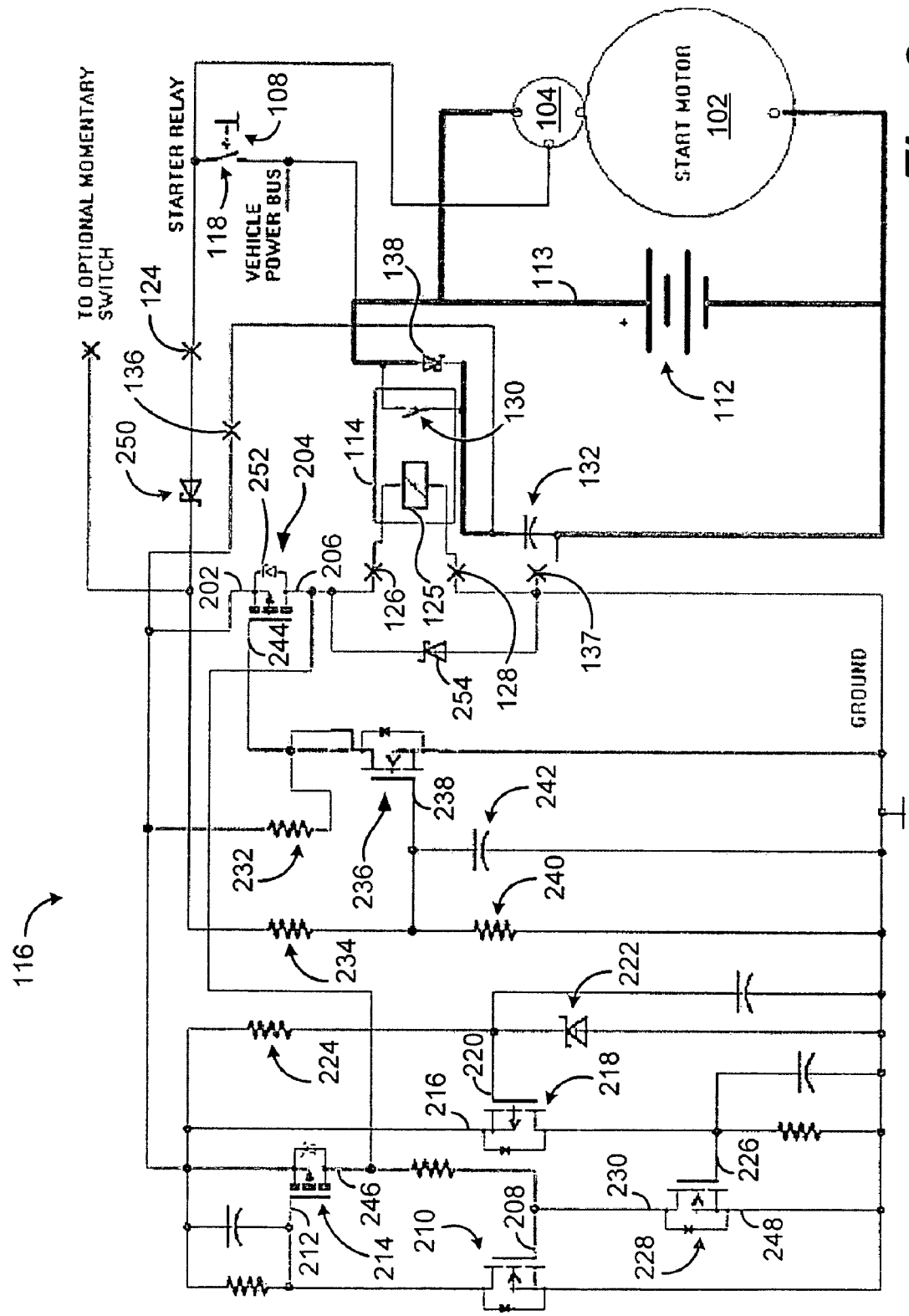
FIG. 2 is a schematic diagram of an engine starter system according to an exemplary embodiment of the present invention.

Turning now to FIG. 2, the figure is a schematic diagram illustrating the engine starter system 100 with the isolator control module 116 illustrated in greater detail and in accordance with an exemplary embodiment of the present invention. The isolator control module 116 can provide a start-up time delay to reduce ring gear milling. The isolator control module 116 can also sense the voltage of the supercapacitor 132 as the supercapacitor 132 recharges to a predetermined voltage. Once the predetermined voltage is sensed, the isolator control module 116 can initiate isolation of the super capacitor 132 from the battery bus 113.

In one possible state of the system, the start switch may be in its off position such that contacts 118 are open. In this state, the isolator control module 116 may allow a full charge to develop on supercapacitor 132. In this fully charged state, the voltage of the supercapacitor 132 can be approximately equal to the voltage of the battery bus 113.

Once the supercapacitor 132 is charged, and node 124 is open circuit, there can be no voltage applied to bias the transistor 236 into a conducting state, thus resistor 232 can pull the gate 244 of transistor 204 to its source voltage and transistor 204 may remain off. Since transistor 204 may be off, the drain 206 of transistor 204 may be pulled down to ground potential through the coil resistance of the isolator contactor 114. Therefore, the gate 208 of transistor 210 may also be grounded and transistor 210 may be off. Since transistor 210 may be off, or in a non-conducting state, the gate 212 of transistor 214 can be pulled up to the voltage of the supercapacitor 132. Transistor 214 may therefore be off. Transistor 214 being in its off state can be considered consistent with the coil of the isolator contactor 114 resting at ground.

The source terminal 216 of transistor 218 is connected to the terminal voltage of supercapacitor 132, which may be at a level representing full charge, and the gate 220 of transistor 218 may be biased on by the action of the zener diode 222 and a resistor 224. Transistor 218 can be in a conducting state. The action of transistor 218 conducting would normally bias the gate 226 of the transistor 228 to turn it on. However, the drain 230 of the transistor 228 may be pulled to ground through the coil of the isolator contactor 114. Therefore, transistor 228 and transistor 218 may play no role at this point in time. Zener diode 222, is biased through resistor 224 and the gate 220 of transistor 218 may be biased at a voltage level less than the terminal voltage of supercapacitor 132 because the zener voltage is selected to be about eleven volts. Here, the terminal voltage of the supercapacitor 132 may be approximately 13.5 volts representing a full charge. As discussed below, the action of transistor 218 and the zener voltage value of diode 222 can determine the voltage to which supercapacitor 132 charges during the recharging process.

When the starter relay 108 is turned on, the coil of starter contactor 104 can energize thereby closing the contacts of the starter contactor 104. The closed contacts of the starter contactor 104 may allow a high current to flow into starter motor 102 out of the positive terminal 122 of the battery 112. The load of rotating the starter motor 102 can decrease the voltage of the battery 112 to a value near eight volts. Because isolator contactor 114 remains off, no current may flow from the supercapacitor 132 to the starter motor 102. The initial voltage level of the battery bus 113, which may decrease to approximately eight volts, can be applied through starter relay 108 to node 124 and passed on to the source terminal 202 of transistor 204 and network resistors 232 and 234. The transistor 236 can be initially off because the gate 238 of transistor 236 is initially at ground potential through a resistor 240. When a capacitor 242 charges through resistor 234 to a gate-source threshold voltage of transistor 236, a gate 244 of transistor 204 can be pulled below the applied battery bus 113 voltage when transistor 236 turns on. Transistor 204 can therefore be turned on and the voltage on the supercapacitor terminal node 136 can be applied to the coil of the isolator contactor 114. Applying this voltage to the coil of the isolator contactor 114 can operate isolator contacts 130. After the delay time associated with isolator contacts 130 closing, supercapacitor 132 can electrically connect to the battery bus 113 and the starting circuit.

The connection of supercapacitor 132 may result in an increase in battery bus 113 voltage to approximately ten or eleven volts. The delay of connecting supercapacitor 132, which is determined by a time constant associated with resistor 234 and capacitor 242, may substantially reduce or eliminate ring gear milling.

Normally the user may continue to hold the start switch or otherwise maintain contacts 118 in their closed state until the engine starts. After this, when contacts 118 open, isolator contactor 114 can still operate because transistor 214 may remain on and latched. This latching can occur when transistor 218 turns off as the voltage of supercapacitor 132 decreases. This can occur when the contacts 130 close.

This latching of transistor 214 can be understood by examining the interplay of transistors 210, 228, and 218. The instant that transistor 204 turns on, the supercapacitor terminal node 136 voltage can also be applied to the drain 246 of transistor 214, which in turn may bias the gate 208 of transistor 210 with a positive voltage. This positive voltage may be greater than a gate-source threshold voltage of transistor 210. However, transistor 228 may pull gate 208 to ground potential, keeping transistor 210 in the off state. Transistor 214 can remain off until transistor 210 is able to turn on. Transistor 214 may turn on when transistor 228 is turned off by the action of transistor 218 turning off. Transistor 218 may turn off when the voltage of the supercapacitor 132 decreases as the contacts 130 close. Transistor 210 may then turn on, pulling the gate 212 of transistor 214 dozen to ground potential, thus turning transistor 214 on. Transistor 214 may remain latched on through the action of transistor 210, transistor 228, and transistor 218, even though the contacts 118 open when the start switch is released and node 124 becomes an open circuit.

When the start switch is turned off, the contacts 118 can open and transistor 204 returns to the off state. Isolator contactor 114 can continue to operate through the latch comprised of transistor 214 and transistor 228, as described above.

As the supercapacitor 132 is recharged, the voltage of the supercapacitor 132 can increase. While this occurs, transistor 218 may remain off even though the source terminal 216 has this voltage applied to it. This voltage can initially be approximately eight volts, depending upon the degree of discharge experienced by supercapacitor 132. Because the zener diode 222 voltage can be greater than this value and therefore is not conducting current, the gate 220 of transistor 218 may be equal to the source 216 voltage and the transistor 218 may remain off. With transistor 218 off, transistor 228 can remain off and transistor 214 can be on or continue to conduct.

The contacts 130 may open as follows. As the voltage of the supercapacitor terminal node 136 increases above the zener voltage of the zener diode 222 by a predetermined amount, the subsequent current flow through resistor 224 can bias the gate 220 of transistor 218 to turn it on. The source voltage of transistor 218 can then be applied to gate 226 of transistor 228, turning on transistor 228. Transistor 228 turning on can ground gate 208 of transistor 210, turning it off. With transistor 210 off, the gate 212 of transistor 214 may increase to its source voltage and transistor 214 may turn off. With transistor 214 off, voltage may be removed from the isolator contactor 114 and the contacts 130 can open. Furthermore, voltage can also be removed from the source terminal 248 of transistor 228, which keeps it off.

A diode 250 may be used to isolate the battery bus 113 voltage from the starter circuit because a path through a body diode 252 of transistor 204 exists. A diode 254 may be used to clamp a reverse voltage spike caused by turning off the coil 125 of isolator contactor 114.

Figure 3:
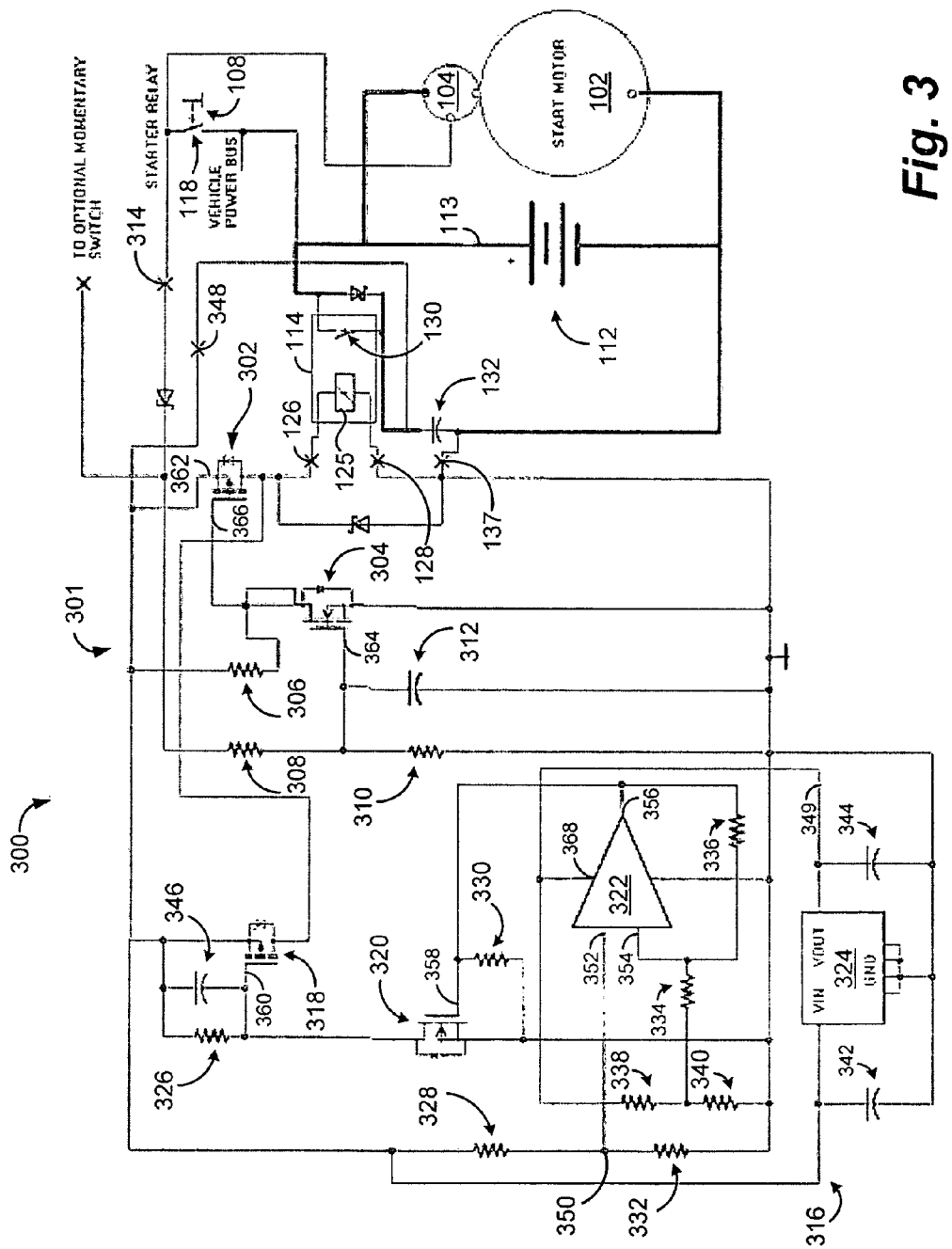
FIG. 3 is a schematic diagram of an engine starter circuit according to an exemplary embodiment of the present invention.

Turning now to FIG. 3, the figure is a schematic diagram illustrating an engine starter circuit 300 in accordance with an exemplary embodiment of the present invention. In contrast to the starting circuit illustrated in FIG. 2 which operates only when the starter relay 108 is engaged, this starter circuit 300 can operate to recharge supercapacitor 132 regardless of the state of the starter relay 108.

Circuit 300 includes two circuits that operate independently of one another but both actuate isolator contactor 114. A first circuit 301 includes a transistor 302, a transistor 304, biasing resistors 308, 306, and 310, and capacitor 312, associated with transistor 302 and transistor 304, and node 314. A second circuit 316 includes a transistor 318, a transistor 320, a comparator 322, a voltage regulator 324, biasing resistor 326, 328, 330, 332, 334, 336, 338, and 340, and capacitors 342, 344, and 346, and node 348.

Considering first an initial state where supercapacitor 132 is fully charged the starter circuit 300 may operate as follows. With node 314 open circuited (start switch open), transistors 302 and 304 may not actuate coil 125 of isolator contactor 114 at terminals 126 and 128. However, second circuit 316 is not dependent upon the connection at node 314, but rather can depend only upon the voltage level at node 348, the terminal voltage of supercapacitor 132. When the terminal voltage of supercapacitor 132 decreases below a predetermined level, the second circuit 316 turns transistor 318 on and thereby actuates isolator contactor 114. Transistor 318 may turn off when the supercapacitor 132 recharges and the voltage level at node 348 increases back to the predetermined full charge level.

Irrespective of the state of the start switch, isolator contactor 114 can be actuated by comparator 322. The terminal voltage of supercapacitor 132 may bias the voltage divider network formed by resistors 328 and 332. When the voltage at a node 350 decreases below a predetermined value, the voltage at the inverting input terminal 352 of comparator 322 decreases below the voltage at the non-inverting terminal 354 of comparator 322. This input condition for comparator 322 may cause the output terminal 356 of comparator 322 to go high, which in turn can bias the gate 358 of transistor 320 so that transistor 320 turns on and biases the gate 360 of transistor 318, which then turns on. Voltage may be conducted to node 126 through transistor 318 allowing isolator contactor 114 to actuate and close the contacts 130. With the contacts 130 closed, current from the battery 112 can flow and recharge the supercapacitor 132.

Recharging of the supercapacitor 132 can cause the voltage at node 348 to increase until the voltage at the inverting input terminal 352 of comparator 322 exceeds the voltage at the non-inverting terminal 354 of comparator 322. At which time, the output terminal 356 of comparator 322 can switch to low and transistor 318 can turn off. The result is that the coil 125 of isolator contactor 114 may turn off, disconnecting the supercapacitor 132 from the battery bus 113.

The second circuit 316 can operate as described above if the starter relay 108 is actuated and the subsequent starting event causes a discharge of supercapacitor 132. Additionally, self-discharge of supercapacitor 132 can also result in operation of comparator 322 even though the starter relay 108 may remain off.

When the starter relay 108 is turned on, the coil of the starter contactor 104 can energize and the starter contactor 104 contacts may close. A high current can flow into the starter motor 102 from the positive terminal 122 of the battery 112. The battery voltage may decrease to a value of about eight volts. Because the isolator contactor 114 may still be off, no current flows from the supercapacitor 132. The terminal voltage of the supercapacitor 132 can be applied through the starter relay 108 to node 348 and can be conducted on to the source 362 of transistor 302 and the network resistors 306 and 308. Transistor 304 may be initially off because the gate 364 of transistor 304 is initially at ground potential through resistor 310 prior to battery bus voltage 113 being applied through node 314. When capacitor 312 charges through resistor 308 to a gate-source threshold voltage of transistor 304, the gate 366 of transistor 302 may be pulled below the applied voltage of the terminal voltage of the supercapacitor 132 when transistor 304 turns on. Transistor 302 can therefore be turned on and the terminal voltage of the supercapacitor 132 may be applied to the coil 125 of isolator contactor 114, which in turn operates isolator contacts 130. After the delay time associated with the closing of the isolator contacts 130, supercapacitor 132 may be electrically connected to the battery bus 113 and the starting circuit.

The connection of supercapacitor 132 may result in an increase in the voltage of the battery bus 113 to approximately ten or eleven volts. The delay of connecting supercapacitor 132, which may be determined by a time constant associated with resistor 308 and capacitor 312, can substantially reduce or eliminate ring gear milling.

The comparator 322 may provide a hysteresis effect to the starter circuit. The terminal voltage value of the supercapacitor 132 at which the isolator contactor 114 is engaged may be a lower value than the voltage value at which isolator contactor 114 is turned off. Comparator 322 can derive its supply voltage from the voltage regulator 324. The voltage regulator 324 may be, for example, a five volt regulator. The voltage input to voltage regulator 324 can be supplied by node 348 which is the voltage of supercapacitor 132. The voltage regulator 324 can supply a relatively stable voltage on regulated supply bus 349. Regulated supply bus 349 may be used as a reference for subsequent operation of comparator 322.

The voltage at node 350 can relate to the terminal voltage of supercapacitor 132 and is connected to the inverting input 352 of the comparator 322. Comparator 322 can compare the voltage at node 350 to the non-inverting input 354 of comparator 322. The value of the voltage at the non-inverting input 354 can be the superposition of two voltages. The first superimposed voltage can be derived from the supply voltage of comparator 322 at terminal 368. The second superimposed voltage can be derived from the output voltage of comparator 322 at output terminal 356. The supply voltage of comparator 322 at node 368 can remain constant throughout operation of the circuit because it is regulated by the voltage regulator 324. Thus, the non-inverting input 354 can change whenever the output voltage of comparator 322 at output terminal 356 changes.

Therefore, the non-inverting input 354 voltage can take on two values, one value for the on state of comparator 322 and one value for the off state of comparator 322. When the output voltage of comparator 322 is zero, the non-inverting input 354 voltage is the lower of the two values. In this case, the terminal voltage value of supercapacitor 132 at which comparator 322 may change state will be the lower of the two values. Changing the state of comparator 322 can turn on the isolator contactor 114 allowing the supercapacitor 132 to recharge.

When the output voltage of comparator 322 is high, that is, substantially equal to the value of the supply voltage, the non-inverting input 354 voltage can take on the higher of the two values. In this case, the terminal voltage value of the supercapacitor 132 that can cause comparator 322 to change state may be the higher of the two values. Thus, a change of state of the comparator 322 may turn off the isolator contactor 114 terminating the recharging of the supercapacitor 132.

When the isolator contactor 114 is turned off, the supercapacitor 132 terminal voltage can decrease to the lower of the two change-of-state voltage values before comparator 322 causes isolator contactor 114 to turn on. When isolator contactor 114 is turned on, the supercapacitor 132 terminal voltage increases to the higher of the two change-of-state voltage values before the comparator 322 causes isolator contactor 114 to turn off. These two change-of-state voltage values can be determined by selecting the values of resistors 328, 332, 338, 340, 334, and 336 together with values of regulated supply bus 349 and the full charge voltage of supercapacitor 132.

The circuit, including comparator 322, may be considered an inverting comparator with hysteresis. The difference between the two predetermined values of input node voltage at which a change-of-state occurs may be considered the hysteresis band. The center of the hysteresis band can be approximated by averaging the two predetermined voltage values. The center of the hysteresis band may be determined by the values of resistors 338 and 340 together with the value of the regulated supply bus 349. The hysteresis band can be determined by the values of resistors 334 and 336 and the value of the regulated supply bus 349.

In an exemplary embodiment where resistor 338 is 20 Kohms, resistor 340 is 10 Kohms, resistor 334 is 50 Kohms, resistor 336 is 1000 Kohms, and the regulated supply voltage at node 349 is five volts, the center of the hysteresis band may be determined to be 3.289 volts. The hysteresis band may be computed to be 0.268 volts. Therefore, the upper value for change-of-state can be computed to be 3.423 volts and the lower value may be 3.155 volts. Resistors 328 and 332 can divide the supercapacitor 132 voltage which is compared to these change-of-state values. The voltage divider ratio in the example can be 0.263. Division of this ratio into the two change-of-state values can result in voltage values of 13.0 volts and 12.0 volts, respectively. Accordingly, the circuit can recharge supercapacitor 132 whenever the voltage of the supercapacitor decreases to 12.0 volts or less. The circuit will stop charging the supercapacitor 132 whenever the voltage of the supercapacitor 132 increases to 13.0 volts or more. Thus, the starting circuit 300 may automatically maintain the charge of the supercapacitor 132 without the need for the optional diode 138.

Figure 4:
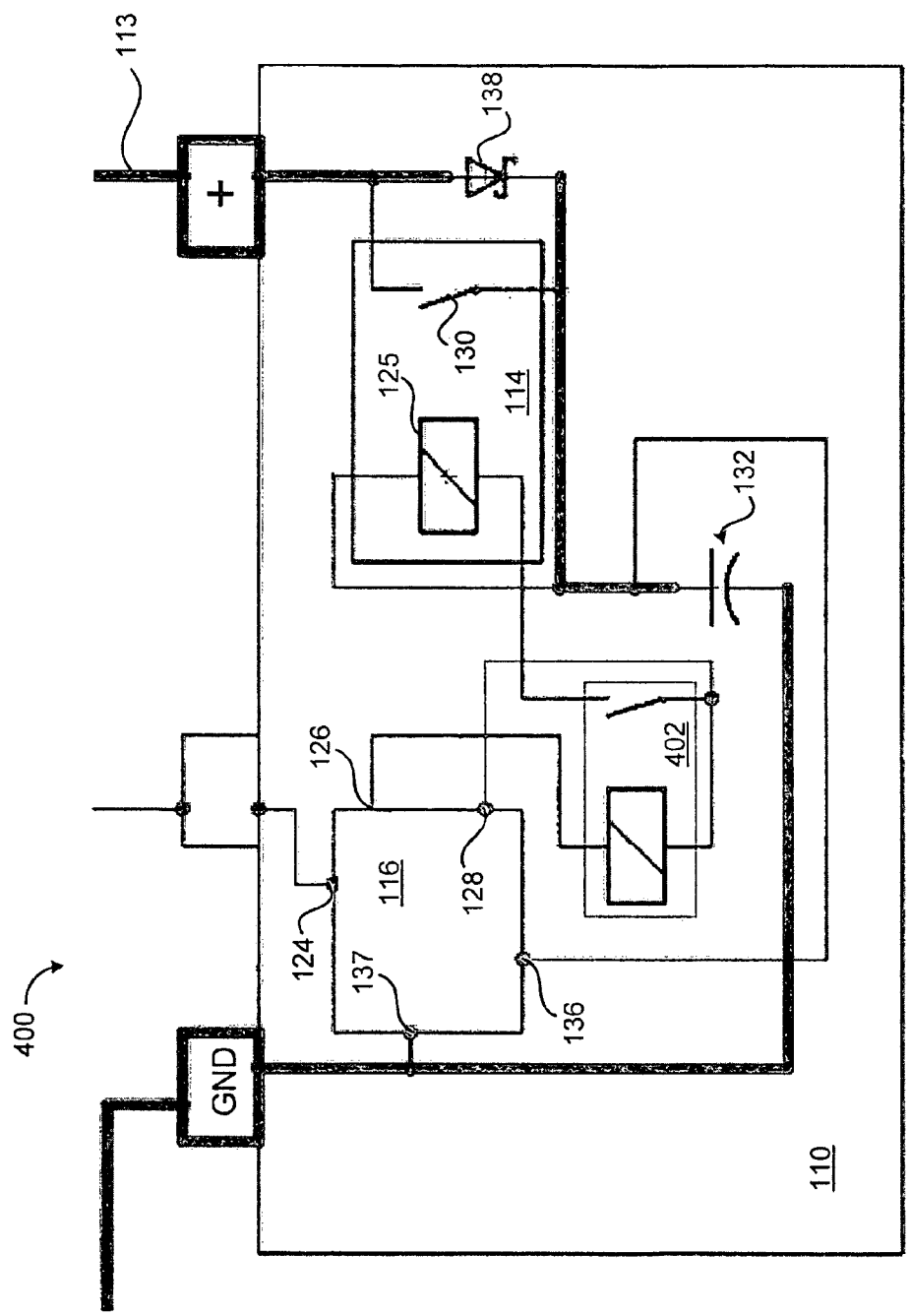
FIG. 4 is a schematic diagram of a supercapacitor starter module according to an exemplary embodiment of the present invention.

Turning now to FIG. 4, the figure illustrates a schematic view of the supercapacitor starter module 110 according to an exemplary embodiment of the present invention. The coil 125 of the isolator contactor 114 can be powered by the supercapacitor 132 voltage rather than from the voltage of the battery bus 113. A relay 402 can be operated by nodes 126 and 128, which in turn may operate isolator contactor 114. The coil 125 of isolator contactor 114 generally may require a predetermined minimum voltage level and current level to operate. Such a minimum voltage level and current level may not be available from the battery bus 113 since the battery 112 may incur a large voltage drop when initially engaged with the starter motor 102. The relay 402 may be selected to have a relatively lower power requirement that will readily operate at the voltage present on battery bus 113 even when the battery 112 is incurring a large voltage drop during a start event. Alternatively, the relay 402 may comprise a low power switch such as, for example, an open collector transistor switch or a solid state relay.

The starter isolator module can primarily isolate the charged supercapacitor module from the battery bus 113 and connect it to the bus only during starting and during the period immediately after starting, while high current flows from the battery 112 to recharge the supercapacitor 132. Alternatively, the supercapacitor 132 may connect to the battery bus 113 whenever the supercapacitor 132 requires recharging, irrespective of any starting events. During a start event, connection of the supercapacitor 132 to the battery bus 113 may occur after a short delay in order to prevent ring gear milling. Disconnection of the super capacitor 132 from the battery bus 113 may occur when the supercapacitor 132 voltage reaches a final voltage determined by a design parameter internal to the starter isolator module. After disconnection of the supercapacitor 132 from the battery bus 113, subsequent recharge current may continue to route through an optional diode as shown previously in FIG. 1.

Figure 5:
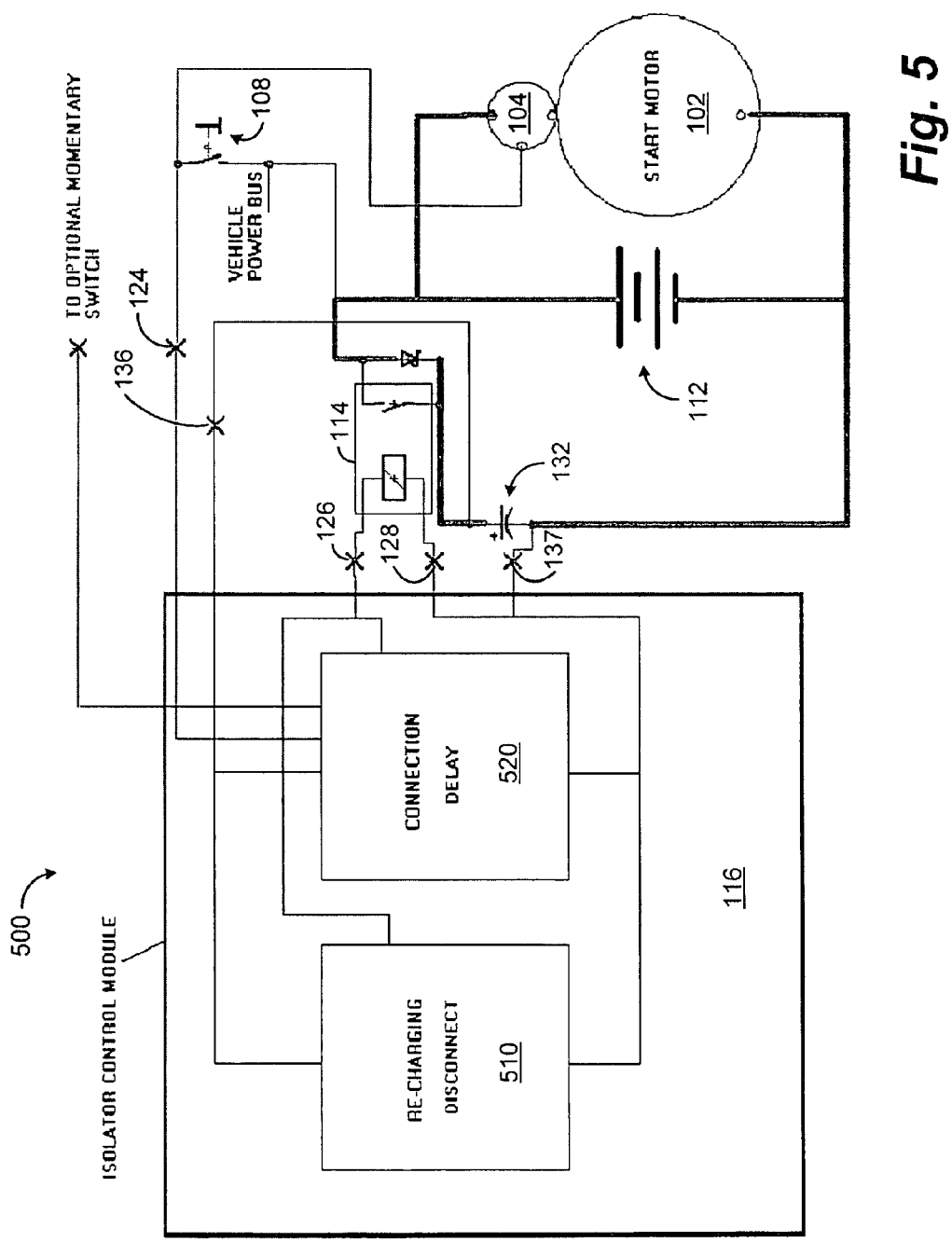
FIG. 5 is a schematic diagram of a subsystem abstraction of an isolator control module connected to isolate a supercapacitor according to an exemplary embodiment of the present invention.

Turning now to FIG. 5, the figure illustrates a subsystem block diagram of the isolator control module 116 for isolating the supercapacitor according to an exemplary embodiment of the present invention. The isolator control module 116 may be considered functionally as having two subsystems. The first subsystem is the recharge disconnect circuit 510. The recharge disconnect circuit 510 can function to isolate the supercapacitor 132 from the battery 112 once the supercapacitor 132 has completely recharged. The second subsystem is the connection delay circuit 520. The connection delay circuit 520 can function to isolate the supercapacitor 132 from the battery 112 for a brief period at the beginning of a start event. As discussed previously, this brief start-up delay may substantially reduce or eliminate ring gear milling. An example start-up delay may be thirty milliseconds.

The isolator control module 116 may interface with the other elements of the starting circuit 500 through five terminals or nodes 124, 136, 126, 128, and 137. Through terminal 137, the isolator control module 116 can connect to the ground reference potential. Through terminal 124, the isolator control module 116 may sense the voltage of the battery 112 when the starter relay 108 is closed to start the engine. Through terminal 136, the isolator control module 116 may sense the voltage of the supercapacitor 132. Through terminals 126 and 128, the isolator control module 116 may energize the coil of the isolator contactor 114. The isolator contactor 114 can connect and disconnect the supercapacitor 132 in parallel to the battery 112 to boost the current supplied to starter motor 102 through starter contactor 104 during a start event.

Figure 6:
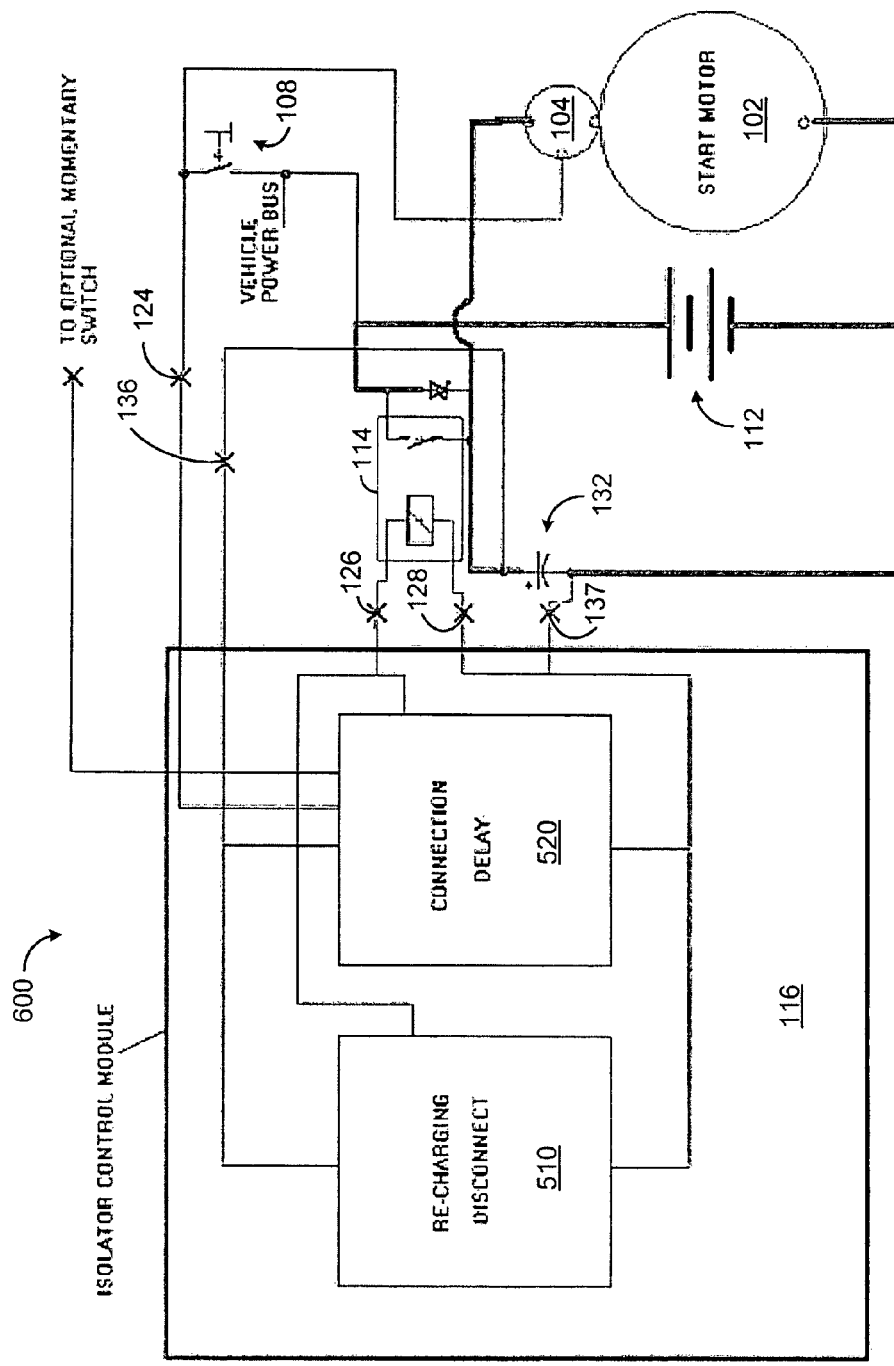
FIG. 6 is a schematic diagram of a subsystem abstraction of an isolator control module connected to isolate a battery from a supercapacitor according to an exemplary embodiment of the present invention.

Turning now to FIG. 6, the figure illustrates a subsystem block diagram of the isolator control module 116 for isolating the battery 112 according to an exemplary embodiment of the present invention. The starting circuit 600 is nearly identical to the starting circuit 500 illustrated in FIG. 5. One difference is that the roles of the supercapacitor 132 and the battery 112 may be reversed between circuit 500 and circuit 600. Specifically, in circuit 600, the supercapacitor 132 can always be connected to the starter contactor 104, while the battery 112 is isolated by the isolator contactor 114. One of ordinary skill in the art will appreciate that the present invention may be used to isolate either the primary power source or the secondary power source without departing from the scope or spirit of the invention.

Figure 7:
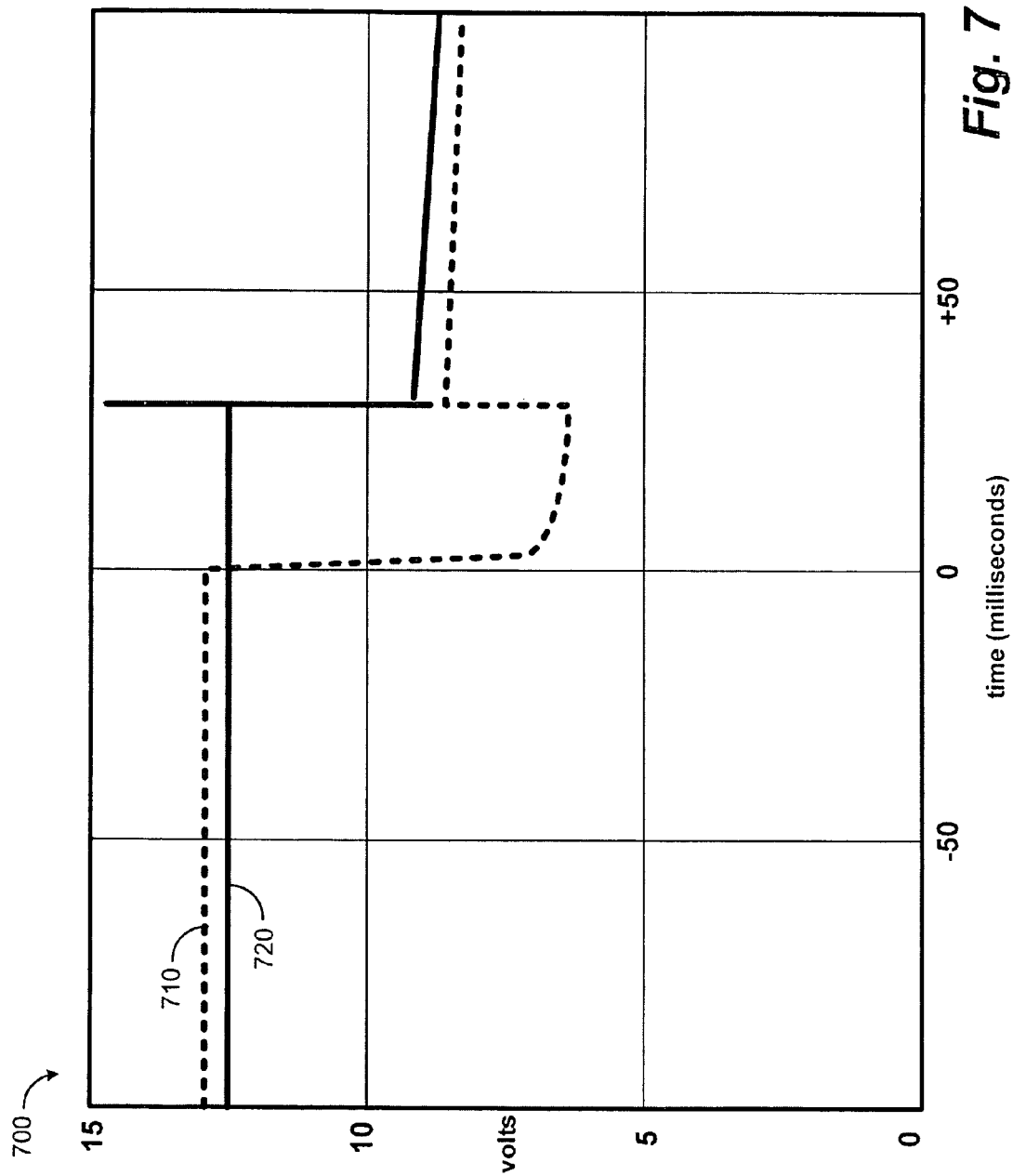
FIG. 7 is a graph of the supercapacitor voltage and the battery bus voltage versus time highlighting the start-up delay according to an exemplary embodiment of the present invention.

Turning now to FIG. 7, the figure is a graph 700 of the supercapacitor 132 voltage and the battery bus 113 voltage versus time highlighting the start-up delay according to an exemplary embodiment of the present invention. Graph 700 includes an x-axis graduated in units of time, and a y-axis graduated in units of voltage. Graph 700 includes a trace 720 indicative of supercapacitor 132 voltage with respect to time and a trace 710 indicative of battery bus 113 voltage with respect to time.

In an initial state, prior to time zero milliseconds, the start switch may be in an off position such that contacts 118 are open and isolator control module 116 develops a full charge on supercapacitor 132 approximately equal to battery bus 113 voltage. Thus, prior to time zero, the two voltage levels are nearly equal.

When the starter relay 108 is turned on at time zero milliseconds, the coil of starter contactor 104 energizes and the starter contactor 104 contacts close. A high current flows into starter motor 102 out of the battery 112. Trace 710 of battery voltage decreases to a value near six or seven volts. Isolator contactor 114 is still off, so no current flows from the supercapacitor 132. Thus, trace 720 of the voltage on the supercapacitor 132 does not change at time zero. After a brief start-up delay of about thirty milliseconds, the supercapacitor 132 is electrically connected to the battery bus 113. At a time of approximately thirty milliseconds, trace 720 of the supercapacitor 132 voltage spikes as the supercapacitor 132 is connected to the battery 112. After this spike, trace 720 illustrates a voltage drop in the supercapacitor 132 as the battery bus 113 trace 710 is boosted upward by about three volts. This boost is due to the supercapacitor 132 supplying additional current to the starting event. The unexpected functional effectiveness and cost effectiveness of the delayed voltage boost may be appreciated from the test data illustrated in the plot 700. The brief start-up delay in connecting supercapacitor 132 may substantially eliminate or reduce ring gear milling.

Figure 8:
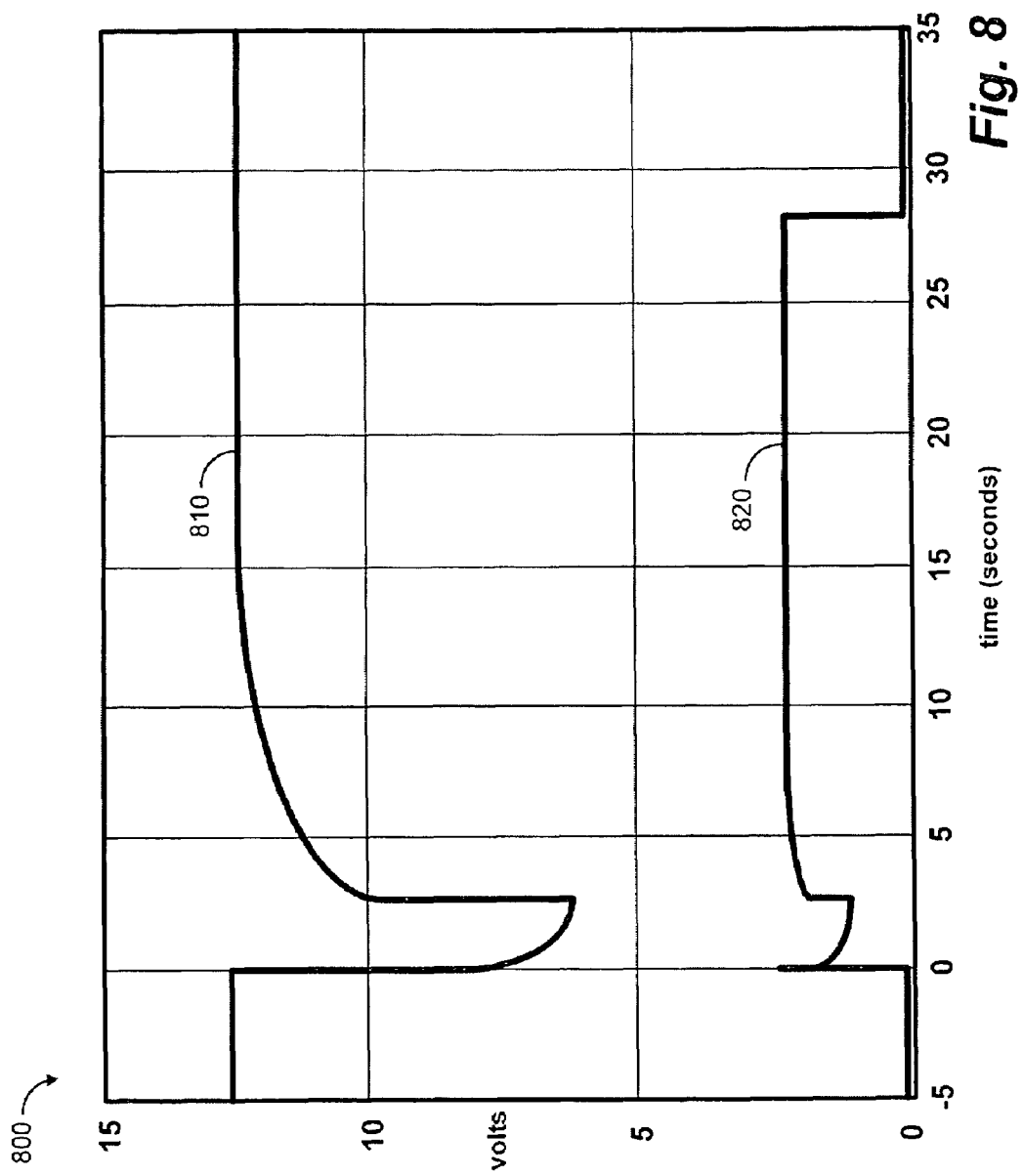
FIG. 8 is a graph of the supercapacitor voltage highlighting the recharge disconnection according to an exemplary embodiment of the present invention.

Turning now to FIG. 8, the figure is a graph of the supercapacitor voltage highlighting the recharge disconnection according to an exemplary embodiment of the present invention. Graph 800 includes an x-axis graduated in units of time, and a y-axis graduated in units of voltage. Graph 800 includes a trace 810 indicative of the voltage of the super capacitor 132. Graph 800 also includes a trace 820 (illustrated in relative units only) of the isolation contactor 114 armature.

Prior to time zero, the supercapacitor 132 has a full charge and sits at, for example, about twelve or thirteen volts. At approximately time zero, the supercapacitor 139 operates to boost the starting event for about two or three seconds. During this period, the supercapacitor 132 is partially discharged. The drop in trace 810 between times zero and about two or three seconds illustrated this partial discharge during the starting event. At a time of about two or three seconds, the starter relay 108 is disengaged and the super capacitor 132 begins to recharge. This recharging continues until the predetermined voltage is reached on the supercapacitor 132. Here that voltage is about twelve or thirteen volts and is achieved at about thirteen seconds. At this time, charging of the supercapacitor 132 is completed and the supercapacitor 132 is disengaged as illustrated in trace 820 by the powering down of the isolation contactor armature at about thirteen seconds.

It is understood that one or more the foregoing power supply features may be utilized simultaneously to maintain a full charge on the secondary power source or supercapacitor and provide a time delay between the application of primary power supply power to the load and power from the supercapacitor. That is, charging methods may be achieved with combinations of diodes, charging circuits, and comparators.

In an exemplary embodiment, the power supply is illustrated with respect to an internal combustion engine starter motor as the load. It is appreciated, however, that the power supply concepts described herein could be used in other types of power supply systems and with other types of loads, such as high energy systems, in which initiation of full power delivery is delayed for a time period after initiation of power delivery to the load.

A system has been described that includes a battery; a secondary electric charge storage device; an electric starter motor; a first switch operable to make and break an electrical connection between the battery and the electric starter motor; a second switch operable to make and break an electrical connection between the electric starter motor and the secondary electric charge storage device after a predetermined time delay; and a charging circuit configured to charge the secondary electric charge storage device in response to a voltage of the secondary electric charge storage device.

The system has been further described wherein the charging circuit comprises a diode; wherein the charging circuit comprises the second switch, the charging circuit configured to maintain the second switch closed until the voltage of the secondary electric charge storage device substantially equals a voltage of the battery; wherein the charging circuit comprises a comparator; wherein the charging circuit comprises an inverting comparator circuit with hysteresis; wherein the charging circuit comprises a comparator, wherein the comparator receives a voltage of the secondary electric charge storage device as an input; wherein the secondary electric charge storage device comprises at least one capacitor; and wherein the secondary electric charge storage device comprises at least one battery.

A method has been described that includes the steps of: supplying electrical energy to an engine starter motor from a battery; supplying electrical energy to the engine starter motor from an electric charge storage device; starting the engine; monitoring the terminal voltage of the electric charge storage device after the engine starts; and charging the electric charge storage device while the terminal voltage of the electric charge storage device is less than a predetermined threshold.

The method has been further described wherein charging the electric charge storage device comprises charging the electric charge storage device through a diode; wherein supplying electrical energy to the engine starter motor from an electric charge storage device comprises supplying electrical energy from the electric charge storage device at a time delay after supplying electrical energy to an engine starter motor from a battery; wherein supplying electrical energy to the engine starter motor from an electric charge storage device comprises supplying electrical energy from the electric charge storage device after supplying electrical energy to an engine starter motor from a battery with a time delay determined by a resistor and capacitor network; wherein charging the electric charge storage device comprises charging the electric charge storage device until the terminal voltage of the electric charge storage device is within a predetermined range of a terminal voltage of the battery; isolating the electric charge storage device using an isolator contactor having a coil powered through the battery bus; isolating the electric charge storage device using a relay having a coil powered through the battery bus and an isolator contactor having a coil powered through the electric charge storage device; maintaining the electric charge storage device in a fully charged state by comparing the terminal voltage of the electric charge storage device while the engine is idle and energizing a coil of an isolator contactor to close a contact between the battery and the electric charge storage device; and wherein supplying electrical energy to the engine starter motor from an electric charge storage device comprises supplying electrical energy from at least one supercapacitor.

A method has been described that includes the steps of: supplying a first portion of electrical current from a first power supply; supplying a second portion of electrical current from a second power supply after a time delay; and charging the second power supply while a terminal voltage of the second power supply is less than approximately a terminal voltage of the first power supply.

The method has been further described wherein the first and second power supplies are electrically coupled in parallel after the time delay; monitoring the terminal voltage of the second power supply and electrically coupling the first and second power supplies such that the second power supply is charged by the first power supply to a voltage substantially equal to a voltage of the first power supply; monitoring the terminal voltage of the second power supply and electrically coupling the first and second power supplies such that the second power supply is charged by the first power supply when the terminal voltage of the second power supply is less than a predetermined threshold; and wherein the electrical power is supplied to an engine starting motor from at least one of the first power supply and the second power supply through respective first and second switches wherein charging the second power supply comprises charging the second power supply through the second switch with the first switch open.

A system has been described including a power supply control circuit configured to control a connection of a secondary power source to a power supply output bus wherein the power supply output bus supplies power to a load and includes a first switch configured to initiate a flow of electrical power from the power supply output bus to the load; said circuit comprising: a second switch configured to electrically couple the secondary power source to the power supply output bus; and a control module configured to control the second switch such that the secondary power source is coupled to the power supply bus a predetermined time after the flow of electrical power from the power supply output bus to the load is initiated, said control module further configured to maintain the secondary power source in a charged state based on a terminal voltage of the secondary power source.

The system has been further described wherein the control module is configured to receive an initiation signal indicative of the beginning of a power supply start sequence; wherein the initiation signal is based on a closure of the first switch; wherein the control module is configured to sense the terminal voltage of the secondary power source to control the operation of said second switch; wherein the control module is configured to charge the second electric charge storage device from the power supply output bus based on the voltage of the second electric charge storage device; wherein said control module comprises a diode electrically connected in parallel with said second switch; wherein the control module is configured to maintain said second switch in a closed position until the terminal voltage of the secondary power source substantially equals a voltage of the power supply output bus; wherein the control module comprises a comparator configured to compare the terminal voltage of the secondary power source to an output voltage of a regulated power supply; wherein the comparator is configured to generate a signal that causes said second switch to close if the terminal voltage of the secondary power source is less than the output voltage of the regulated power supply; wherein the secondary power supply comprises at least one capacitor; and wherein the secondary power supply comprises at least one battery.

A system has been described including: an internal combustion engine: an electric starter motor to start the internal combustion engine; a battery; a secondary electric charge storage device; a first switch operable to make and break an electrical connection between the battery and the electric starter motor; a second switch operable to make and break an electrical connection between the electric starter motor and the secondary electric charge storage device, a first control circuit configured to charge the secondary electric charge storage device in response to a voltage of the secondary electric charge storage device; and a second control circuit configured to close the second switch after the first switch is closed with a predetermined time delay between a closing time of the first switch and a closing time of the second switch.

The system has been further described to include a vehicle powered by the internal combustion engine; an electrical power generator powered by the internal combustion engine; and wherein the secondary electric charge storage device comprises at least one supercapacitor.

A system has been described to include: means for primary electric storage; means for secondary electric storage; means for electrically starting an engine; means for charging the means for secondary electric storage in response to a voltage associated with the means for secondary electric storage; means for sensing when the means for primary electric storage is electrically connected to the means for electrically starting an engine; means for providing a predetermined delay in response to sensing when the means for primary electric storage is electrically connected to the means for electrically starting an engine; and means for electrically connecting the means for secondary electric storage to the means for electrically starting an engine in response to the end of the predetermined delay.

The system has been further described wherein the means for charging the means for secondary electric storage comprises a means for charging the means for secondary electric storage until a voltage associated with the means for secondary electric storage is substantially equal to a voltage associated with the means for primary electric storage. Also the system as been further described wherein the means for charging the means for secondary electric storage comprises a means for comparing voltages, wherein the means for comparing voltages is provided a voltage associated with the means for secondary electric storage as an input.

A method has been described to include: a step for supplying electrical energy to an engine starter motor from a battery; a step for delaying a predetermined period after supplying electrical energy to an engine starter motor from a battery and before supplying electrical energy to the engine starter motor from an electric charge storage device; a step for supplying electrical energy to the engine starter motor from an electric charge storage device; a step for starting the engine; a step for monitoring the terminal voltage of the electric charge storage device after the engine starts; and a step for charging the electric charge storage device while the terminal voltage of the electric charge storage device is less than a predetermined threshold.

A system has been described to include an internal combustion engine; an electric starter motor coupled to the internal combustion engine and operable to start the internal combustion engine; a battery; a secondary electric charge storage device; a first switch operable to make and break an electrical connection between the battery and the electric starter motor; a second switch operable to make and break an electrical connection between the electric starter motor and the secondary electric charge storage device; a first control circuit configured to charge the secondary electric charge storage device in response to a voltage associated with the secondary electric charge storage device; and a second control circuit configured to sense when the first switch closes and then provide a predetermined delay before closing the second switch.

While the invention has been described in terms of various specific embodiments, those skilled in the art will recognize that the invention can be practiced with modification within the spirit and scope of the claims.

What is claimed is:

1. A starting system for an internal combustion engine comprising:
 a battery;
 a secondary electric charge storage device;
 an electric starter motor;
 a first switch operable to make and break an electrical connection between the battery and the electric starter motor;
 a second switch operable to make and break an electrical connection between the electric starter motor and the secondary electric charge storage device after a predetermined time delay; and
 a charging circuit configured to charge the secondary electric charge storage device in response to a voltage of the secondary electric charge storage device.

2. The system of claim 1, wherein the charging circuit comprises a diode.

3. The system of claim 1, wherein the charging circuit comprises, the second switch, the charging circuit configured to maintain the second switch closed until the voltage of the secondary electric charge storage device substantially equals a voltage of the battery.

4. The system of claim 1, wherein the charging circuit comprises a comparator.

5. The system of claim 1, wherein the charging circuit comprises an inverting comparator circuit with hysteresis.

6. The system of claim 1, wherein the charging circuit comprises a comparator, wherein the comparator receives a voltage of the secondary electric charge storage device as an input.

7. The system of claim 1, wherein the secondary electric charge storage device comprises at least one capacitor.

8. The system of claim 1, wherein the secondary electric charge storage device comprises at least one battery.

9. A method of starting an engine, comprising the steps of:
 supplying electrical energy to an engine starter motor from a battery;
 supplying electrical energy to the engine starter motor from an electric charge storage device;
 starting the engine;
 monitoring the terminal voltage of the electric charge storage device after the engine starts; and
 charging the electric charge storage device while the terminal voltage of the electric charge storage device is less than a predetermined threshold.

10. The method of claim 9, wherein charging the electric charge storage device comprises charging the electric charge storage device through a diode.

11. The method of claim 9, wherein supplying electrical energy to the engine starter motor from an electric charge storage device comprises supplying electrical energy from the electric charge storage device at a time delay after supplying electrical energy to an engine starter motor from a battery.

12. The method of claim 9, wherein supplying electrical energy to the engine starter motor from an electric charge storage device comprises supplying electrical energy from the electric charge storage device after supplying electrical energy to an engine starter motor from a battery with a time delay determined by a resistor and capacitor network.

13. The method of claim 9, wherein charging the electric charge storage device comprises charging the electric charge storage device until the terminal voltage of the electric charge storage device is within a predetermined range of a terminal voltage of the battery.

14. The method of claim 9, further comprising isolating the electric charge storage device using an isolator contactor having a coil powered through the battery bus.

15. The method of claim 9, further comprising isolating the electric charge storage device using a relay having a coil powered through the battery bus and an isolator contactor having a coil powered through the electric charge storage device.

16. The method of claim 9, further comprising maintaining the electric charge storage device in a fully charged state by comparing the terminal voltage of the electric charge storage device while the engine is idle and energizing a coil of an isolator contactor to close a contact between the battery and the electric charge storage device.

17. The method of claim 9, wherein supplying electrical energy to the engine starter motor from an electric charge storage device comprises supplying electrical energy from at least one supercapacitor.

18. A method of supplying electrical power, comprising the steps of:
 supplying a first portion of electrical current from a first power supply;
 supplying a second portion of electrical current from a second power supply after a time delay; and
 charging the second power supply while a terminal voltage of the second power supply is less than approximately a terminal voltage of the first power supply.

19. The method of claim 18, wherein the first and second power supplies are electrically coupled in parallel after the time delay.

20. The method of claim 18, further comprising the steps of monitoring the terminal voltage of the second power supply and electrically coupling the first and second power supplies such that the second power supply is charged by the first power supply to a voltage substantially equal to a voltage of the first power supply.

21. The method of claim 18, further comprising the steps of monitoring the terminal voltage of the second power supply and electrically coupling the first and second power supplies such that the second power supply is charged by the first power supply when the terminal voltage of the second power supply is less than a predetermined threshold.

22. The method of claim 18, wherein the electrical power is supplied to an engine starting motor from at least one of the first power supply and the second power supply through respective first and second switches wherein charging the second power supply comprises charging the second power supply through the second switch with the first switch open.

23. A power supply control circuit configured to control a connection of a secondary power source to a power supply output bus wherein the power supply output bus supplies power to a load and includes a first switch configured to initiate a flow of electrical power from the power supply output bus to the load; said circuit comprising:
 a second switch configured to electrically couple the secondary power source to the power supply output bus; and
 a control module configured to control the second switch such that the secondary power source is coupled to the power supply bus a predetermined time after the flow of electrical power from the power supply output bus to the load is initiated, said control module further configured to maintain the secondary power source in a charged state based on a terminal voltage of the secondary power source.

24. The circuit of claim 23, wherein the control module is configured to receive an initiation signal indicative of the beginning of a power supply start sequence.

25. The circuit of claim 24, wherein the initiation signal is based on a closure of the first switch.

26. The circuit of claim 23, wherein the control module is configured to sense the terminal voltage of the secondary power source to control the operation of said second switch.

27. The circuit of claim 23, wherein the control module is configured to charge the second electric charge storage device from the power supply output bus based on the voltage of the second electric charge storage device.

28. The circuit of claim 23, wherein said control module comprises a diode electrically connected in parallel with said second switch.

29. The circuit of claim 23, wherein the control module is configured to maintain said second switch in a closed position until the terminal voltage of the secondary power source substantially equals a voltage of the power supply output bus.

30. The circuit of claim 23, wherein the control module comprises a comparator configured to compare the terminal voltage of the secondary power source to an output voltage of a regulated power supply.

31. The circuit of claim 30, wherein the comparator is configured to generate a signal that causes said second switch to close if the terminal voltage of the secondary power source is less than the output voltage of the regulated power supply.

32. The circuit of claim 23, wherein the secondary power supply comprises at least one capacitor.

33. The circuit of claim 23, wherein the secondary power supply comprises at least one battery.

34. An engine system comprising:
an internal combustion engine;
an electric starter motor to start the internal combustion engine;
a battery;
a secondary electric charge storage device;
a first switch operable to make and break an electrical connection between the battery and the electric starter motor;
a second switch operable to make and break an electrical connection between the electric starter motor and the secondary electric charge storage device;
a first control circuit configured to charge the secondary electric charge storage device in response to a voltage of the secondary electric charge storage device; and
a second control circuit configured to close the second switch after the first switch is closed with a predetermined time delay between a closing time of the first switch and a closing time of the second switch.

35. The engine system of claim 34, further comprising a vehicle powered by the internal combustion engine.

36. The engine system of claim 34, further comprising an electrical power generator powered by the internal combustion engine.

37. The engine system of claim 34, wherein the secondary electric charge storage device comprises at least one supercapacitor.

38. A starting system for an engine comprising:
means for primary electric storage;
means for secondary electric storage;
means for electrically starting an engine;
means for charging the means for secondary electric storage in response to a voltage associated with the means for secondary electric storage;
means for sensing when the means for primary electric storage is electrically connected to the means for electrically starting an engine;
means for providing a predetermined delay in response to sensing when the means for primary electric storage is electrically connected to the means for electrically starting an engine; and
means for electrically connecting the means for secondary electric storage to the means for electrically starting an engine in response to the end of the predetermined delay.

39. The system of claim 38, wherein the means for charging the means for secondary electric storage comprises a means for charging the means for secondary electric storage until a voltage associated with the means for secondary electric storage is substantially equal to a voltage associated with the means for primary electric storage.

40. The system of claim 38, wherein the means for charging the means for secondary electric storage comprises a means for comparing voltages, wherein the means for comparing voltages is provided a voltage associated with the means for secondary electric storage as an input.

41. A method of starting an engine, comprising:
a step for supplying electrical energy to an engine starter motor from a battery;
a step for delaying a predetermined period after supplying electrical energy to an engine starter motor from a battery and before supplying electrical energy to the engine starter motor from an electric charge storage device;
a step for supplying electrical energy to the engine starter motor from an electric charge storage device;
a step for starting the engine;
a step for monitoring the terminal voltage of the electric charge storage device after the engine starts; and
a step for charging the electric charge storage device while the terminal voltage of the electric charge storage device is less than a predetermined threshold.

42. An engine-based system comprising:
an internal combustion engine;
an electric starter motor coupled to the internal combustion engine and operable to start the internal combustion engine;
a battery;
a secondary electric charge storage device;
a first switch operable to make and break an electrical connection between the battery and the electric starter motor;
a second switch operable to make and break an electrical connection between the electric starter motor and the secondary electric charge storage device;
a first control circuit configured to charge the secondary electric charge storage device in response to a voltage associated with the secondary electric charge storage device; and
a second control circuit configured to sense when the first switch closes and then provide a predetermined delay before closing the second switch.

* * * * *